Patented Sept. 4, 1951

2,567,088

UNITED STATES PATENT OFFICE 2,567,088

REFRACTORY MATERIAL AND METHOD OF MAKING

Chester C. Teasel, Plymouth, Mich., assignor to National Foundry Sand Company, Detroit, Mich., a corporation of Michigan No Drawing. Application November 3, 1948, Serial No. 58,159

14 Claims. (Cl. 106—57)

This invention relates to plastic compositions and the method of making the same, and especially to those having fire and heat resistant properties.

More particularly, the invention relates to refractory material having a zircon base.

Refractories have heretofore been made from various materials including zircon ($ZrSiO_4$). The latter has become of increasing importance because of its superior refractory qualities including that of an extremely high melting point, strength at high temperatures, and the like. Certain disadvantages have limited the use, however, including that of an undesirably high coefficient of expansion.

It is an object of the present invention to provide a refractory material possessing superior qualities including that of the ability to withstand high temperatures, thermal shock, abrasive or erosive action and to which slag does not readily adhere.

The present invention is directed to refractory material adapted for application in plastic form as a wash or lining, or which is adapted to be formed into refractory bricks and the like.

In the past, refractory material when exposed to relatively high temperatures in metal producing furnaces was burned or eroded from the heat and the materials within the furnace to such an extent that relatively thick furnace linings were required. These had to be replaced often which necessitated the shutting down of the furnace and substantial additional expenditure.

Constructed of material in accordance with the present invention a furnace lining is relatively long-lasting, and considerable expense is saved because of the less frequent necessity of replacing the lining. Considerable commercial success has been achieved through the use of furnace linings made in accordance with the present invention. For example, at the plant of a large manufacturer of automobiles where it previously had been necessary to renew the furnace lining each week, the frequency of renewing has been reduced to about once in 35 weeks.

The refractory brick or block that results from the practice of the present invention is a very hard homogeneous mass which resists slag and abrasive action in addition to that of relatively high temperatures. The material is adapted to be made under high pressure and in relatively large units, a quality in which other refractories have been lacking.

One of the significant advantages of the material of the present invention is that it has relatively low coefficients of expansion and contraction, thus reducing the stresses which would otherwise be set up in the structure and particularly in the zone of very high temperatures.

Other plastic refractory cements and materials have usually been effective only from 2100° to a maximum of about 3100° F. The material of this invention, however, will withstand temperatures from 3300° to 3700° F.

The material is particularly well adapted for use as a refractory lining or as a wash or coating over the linings in nearly all types of furnaces including electrical, blast, cupola, or in marine, railroad or other boilers, or in heating equipment of any kind whether gas, coke, oil or coal fired. It may also be used with ferrous or nonferrous metal producing operations or other industrial or commercial use.

The material is adapted for use in the fluid state as a wash to be plastered or spread upon other refractory linings. In solid form it is especially well adapted to be made into bricks or blocks of various sizes and shapes for use as a refractory. In carrying out the invention various ranges of proportions of the ingredients may be used but it has been found that the proportions set forth in the following examples are particularly well adapted for the purposes stated.

Example I

To produce a material for application in fluid or plastic form the following proportions of the ingredients of the mixture are preferred, it being understood that reasonable deviation may be used.

| | Per cent by weight |
|---|---|
| Zircon sand | 10 |
| Ground zircon sand (200 mesh–6 mesh) | 66⅔ |
| Crushed silica rock (ganister preferred) | 20 |
| Plastic fire clay | 1⅔ |
| Bentonite | 1⅔ |
| Liquid silicate of soda } | According to |
| Water } | fluidity desired. |

Example II

For use in brick or block form substantially the following proportions of ingredients have been found to be preferred:

| | Per cent by weight |
|---|---|
| Zircon sand | 27 |
| Ground zircon sand (200 mesh-6 mesh) | 70 |
| Crushed silica rock (ganister preferred) | 2 |
| Plastic fire clay | ½ |
| Bentonite | ½ |
| Liquid silicate of soda } Water } | Small amount according to fluidity desired. |

The above examples are illustrative of the proportions of the ingredients used with a relatively fluid mixture or with a relatively dry mixture.

The following approximate ranges of the proportions of the ingredients of the mixture are at present believed to be the practical limits for most purposes, but are not intended to represent the actual possible maximum and minimum limits for obtaining useful results:

| | Per cent by weight |
|---|---|
| Zircon sand | 20–60 |
| Ground zircon sand (200 mesh-6 mesh) | 40–80 |
| Crushed silica rock (ganister preferred) | 2–20 |
| Plastic fire clay | 0.5–15 |
| Bentonite | 0.5–10 |
| Sodium silicate (liquid preferred) | 0.5–15 |
| Water | Amount according to fluidity desired and intended use. |

It will be understood by those skilled in the art that the bentonite acts as a binding and suspending agent. It is also recognized that in the place of the plastic fire clay other suitable binders may be used such as ball clay, kaolin, or organic bindings as goulac or glutrin. Although ganister is the preferred form of silica rock it will be understood that other varieties may be employed.

In the manufacturing process the various ingredients of the preferred grain sizes are thoroughly mixed by suitable mechanical means. Although the order of combining the ingredients is not believed to be critical it has been found that the preferred order of adding the ingredients is as follows: Liquid (silicate and water), ganister, ground zircon sand, zircon sand, plastic fire clay, bentonite.

When refractory brick or block is to be made, the proper mixture is formed under ten tons or more pressure into the desired shape and size following which it is air dried at about 212° F., and finally baked for approximately an hour at from 2850° F. to 3100° F.

The invention has been described in detail for the purpose of illustration but it will be obvious that numerous modifications and variations may be resorted to without departing from the spirit of the invention.

What is claimed is:

1. A plastic refractory lining for a furnace comprising, in approximately the following proportions by weight, zircon sand 10%, ground zircon 66⅔%, crushed silica rock 20%, 1⅔% of a selected binder from the group consisting of plastic fire clay, ball clay, and kaolin, and bentonite 1⅔%, together with sodium silicate and water in an amount according to the fluidity desired.

2. A plastic refractory lining for a furnace comprising, in approximately the following proportions by weight, zircon sand 76⅔%, silica rock 20%, bentonite 1⅔%, and 1⅔% of a binder selected from the group consisting of plastic fire clay, ball clay, and kaolin, together with sodium silicate and water in an amount according to the fluidity desired.

3. A plastic refractory lining for a furnace comprising, in approximately the following proportions by weight, zircon sand 76⅔%, silica rock 20%, bentonite 1⅔%, and plastic fire clay 1⅔%, together with sodium silicate and water in an amount according to the fluidity desired.

4. A refractory composition which comprises, in approximately the following proportions by weight, zircon sand 27%, ground zircon 70%, crushed silica rock 2%, bentonite ½%, and ½% of a binder selected from the group consisting of plastic fire clay, ball clay, and kaolin, together with sodium silicate and water in an amount according to the fluidity desired.

5. A refractory composition which comprises, in approximately the following proportions by weight, zircon sand 79%, silica rock 2%, bentonite ½%, and plastic fire clay ½%, together with sodium silicate and water in an amount according to the fluidity desired.

6. A refractory composition which comprises, in approximately the following proportions by weight, zircon sand 96%, silica rock 2%, plastic fire clay 1%, bentonite 1%, together with sodium silicate and water in an amount according to the fluidity desired.

7. A refractory composition which comprises, in approximately the following proportions by weight, zircon sand 96%, silica rock 2%, bentonite 1%, a binder selected from the group consisting of plastic fire clay, ball clay, or kaolin 1%, together with sodium silicate and water in an amount according to the fluidity desired.

8. The method of making refractory brick comprising mixing together zircon sand 10%, ground zircon 66⅔%, silica rock 20%, bentonite 1⅔%, a binder selected from the group consisting of plastic fire clay, ball clay, and kaolin 1⅔%, and liquid sodium silicate, forming the mixture under pressure into unit shapes, heating to approximately 212° F. and holding until the unit shapes are substantially dry, and baking at a temperature in the range of 2850° F. to 3100° F.

9. The method of making a refractory brick comprising mixing together zircon sand 76⅔%, silica rock 20%, bentonite 1⅔%, plastic fire clay 1⅔%, and sodium silicate and water, forming the mixture under pressure into unit shapes, heating to approximately 212° F. and holding until the unit shapes are substantially dry, and baking at a temperature in the range of 2850° F. to 3100° F.

10. The method of making a refractory brick comprising mixing together zircon sand 76⅔%, silica rock 20%, bentonite 1⅔%, a binder selected from the group consisting of plastic fire clay, ball clay, or kaolin 1⅔% sodium silicate and water, forming the mixture under pressure into unit shapes, heating to approximately 212° F. and holding until the unit shapes are substantially dry, and baking at a temperature in the range of 2850° to 3100° F.

11. A refractory composition comprising in approximately the following proportions by weight, zircon sand 20% to 60%, ground zircon 40% to 80%, silica rock 2% to 20%, plastic fire clay 0.5% to 15%, bentonite 0.5% to 10%, sodium silicate 0.5% to 15%, and water in an amount according to the fluidity desired.

12. A refractory composition comprising, in approximately the following proportions by weight, zircon sand 20% to 60%, ground zircon 40% to 80%, silica rock 2% to 20%, a binder selected from the group consisting of plastic fire clay, ball clay, and kaolin 0.5% to 15%, bentonite 0.5% to 10%, sodium silicate 0.5% to 15%, and water in an amount according to the fluidity desired.

13. A refractory composition comprising, in approximately the following proportions by weight, zircon sand 20% to 60%, ground zircon 40% to 80%, silica rock 2% to 20%, an organic binder selected from the group consisting of goulac and glutrin 0.5% to 15%, bentonite 0.5% to 10%, sodium silicate 0.5% to 15%, and water in an amount according to the fluidity desired.

14. The method of making a refractory brick comprising mixing together zircon sand 97%, silica rock 2%, bentonite ½%, plastic fire clay ½%, sodium silicate and water, forming the mixture under pressure into unit shapes, heating to approximately 212° F, and holding until the unit shapes are substantially dry, and baking at a temperature in the range of 2850° F. to 3100° F.

CHESTER C. TEASEL.

No references cited.